(No Model.) 2 Sheets—Sheet 1.

J. M. GILBERT.
BICYCLE.

No. 598,083. Patented Feb. 1, 1898.

WITNESS
C. Nordfors
C. Gerst

INVENTOR
Joel M. Gilbert
BY
Edgar Tate & Co
ATTORNEYS.

THE NORRIS PETERS CO., PHOTO-LITHO., WASHINGTON, D. C.

(No Model.) 2 Sheets—Sheet 2.
J. M. GILBERT.
BICYCLE.
No. 598,083. Patented Feb. 1, 1898.
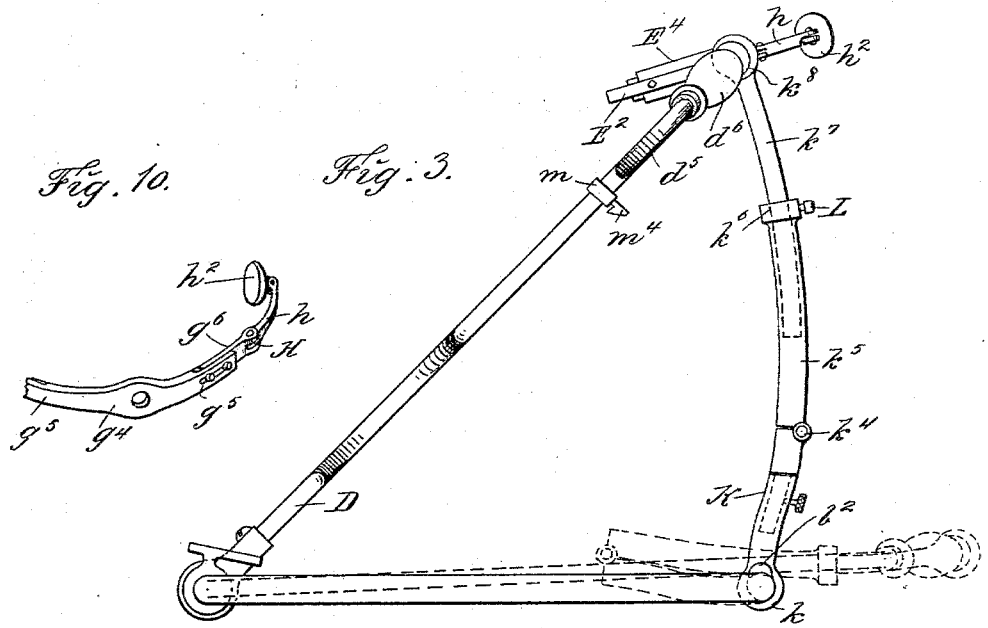
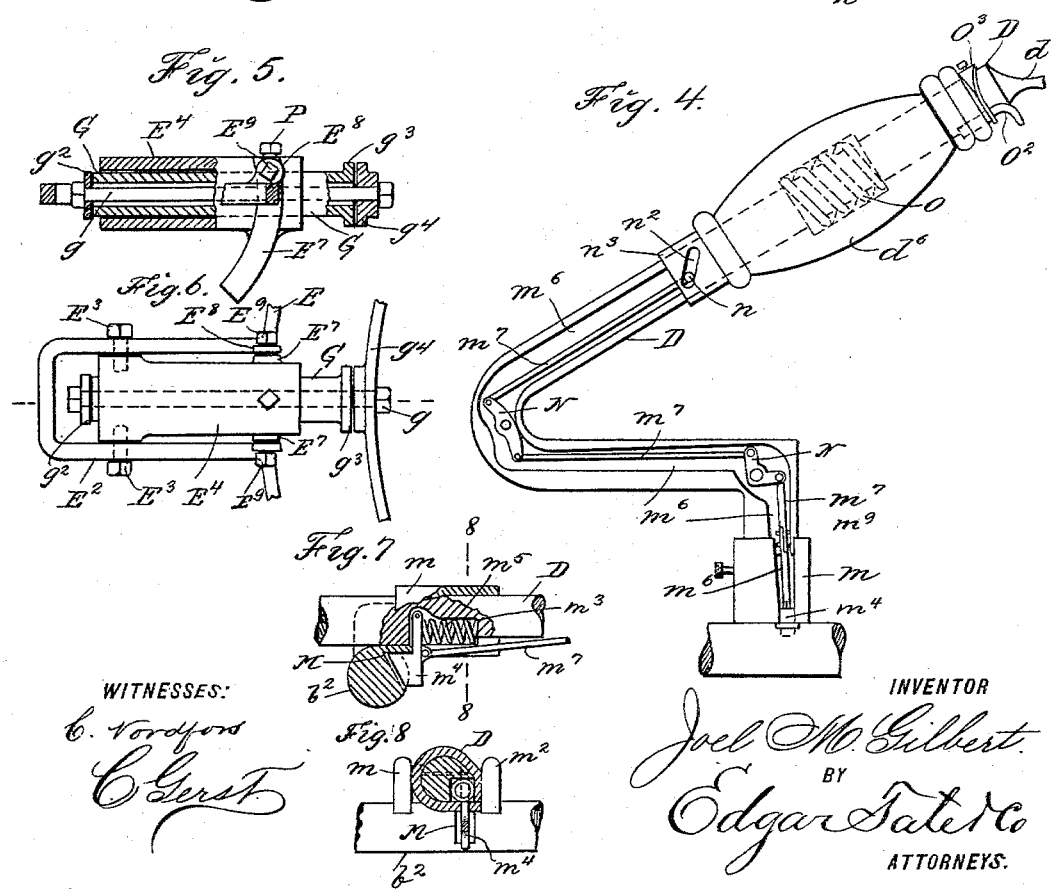
WITNESSES:
C. Vordfors
C. Gerst
INVENTOR
Joel M. Gilbert
BY
Edgar Tate & Co
ATTORNEYS.

UNITED STATES PATENT OFFICE.

JOEL MIX GILBERT, OF CLINTON, CONNECTICUT.

BICYCLE.

SPECIFICATION forming part of Letters Patent No. 598,083, dated February 1, 1898.

Application filed April 22, 1897. Serial No. 633,308. (No model.)

*To all whom it may concern:*

Be it known that I, JOEL MIX GILBERT, a citizen of the United States, residing at Clinton, in the county of Middlesex and State of Connecticut, have invented certain new and useful Improvements in Bicycles, of which the following is a full and complete specification, such as will enable those skilled in the art to which it appertains to make and use the same.
This invention relates to bicycles and similar vehicles; and the object thereof is to provide an improved mechanism for vehicles of this class which will project backwardly and upwardly in front of the rider to enable the vehicle to be steered or guided while the rider maintains an upright position, a further object being to provide a guiding mechanism which is adapted to swing upwardly out of the way of the rider when mounting or dismounting, a further object being to provide a device of this class by means of which the vehicle may be guided by the body of the rider without applying the hands to the handle-bar or handles; and with these and other objects in view the invention consists in the construction, combination, and arrangement of parts hereinafter described and claimed.

Figure 1:
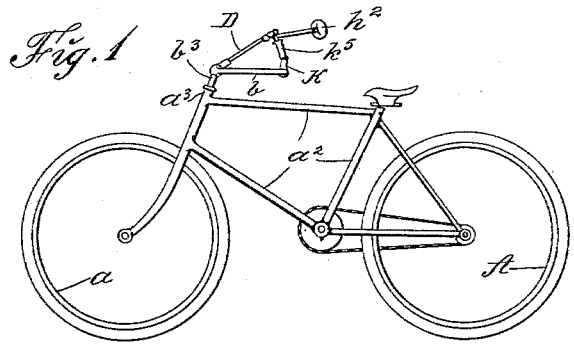
Figure 2:
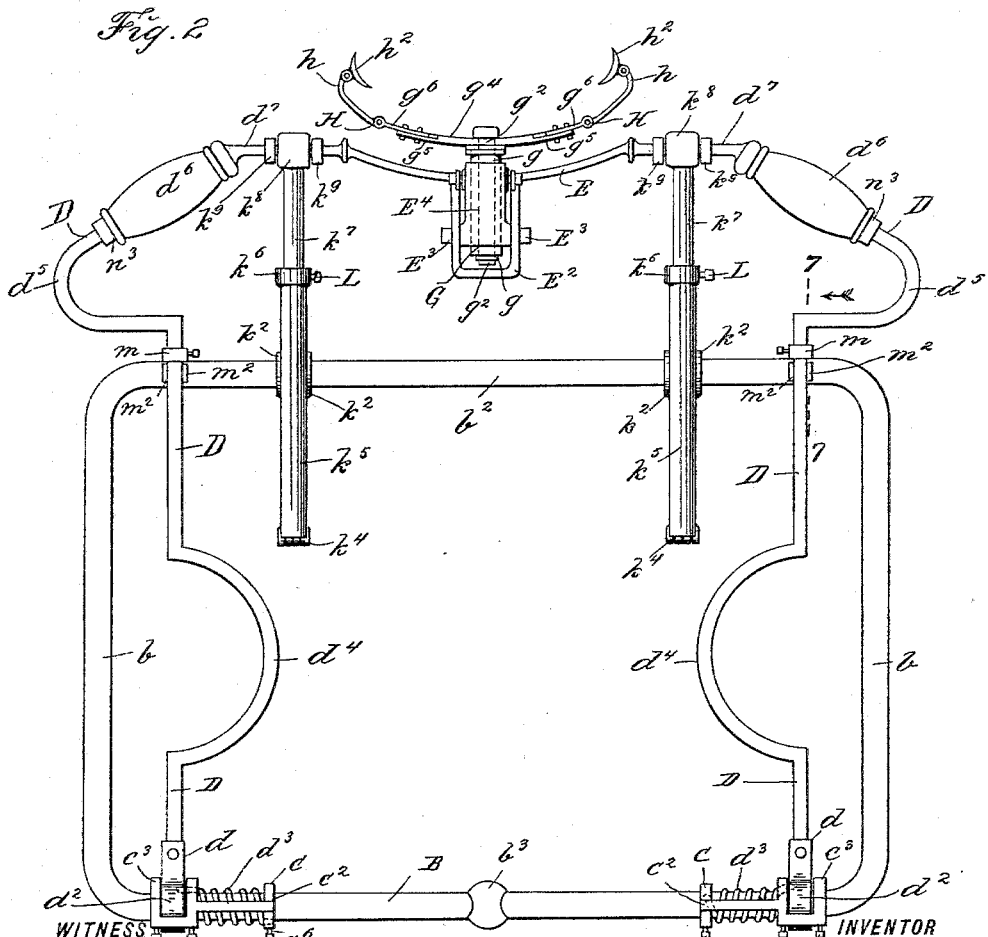
Figure 9:
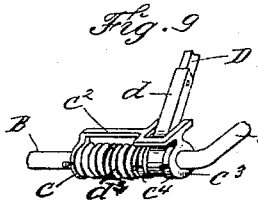

This invention is an improvement on that described and claimed by me in application for Letters Patent filed in the United States Patent Office February 24, 1896, Serial No. 580,482, and said invention is fully disclosed in the following specification, of which the accompanying drawings form a part, in which—
Figure 1 is a side view of a bicycle provided with my improvement; Fig. 2, a plan view of the guiding or steering mechanism detached; Fig. 3, a side view thereof; Fig. 4, a bottom plan view of one part of the handle-bar or guiding mechanism; Fig. 5, a sectional side view of a detail of said mechanism; Fig. 6, a plan view thereof; Fig. 7, a sectional side view of a detail of the construction on the line 7 7 of Fig. 2; Fig. 8, a section on the line 8 8 of Fig. 7, and Figs. 9 and 10 are perspective views of details of the construction.

In the drawings forming part of this specification the separate parts of my improvement are designated by the same letters of reference in each of the views, and in said drawings, reference being made to Fig. 1, A represents the drive-wheel, and $a$ the guide-wheel, of an ordinary bicycle or similar vehicle, and $a^2$ the frame thereof, which is of the usual construction, and $a^3$ the forward upright tubular head of the frame through which the tubular stem of the forward fork passes with which the guiding mechanism is connected, and in the practice of my invention I provide a guiding mechanism which comprises a main frame consisting of a transverse front rod B, side rods $b$, and a transverse rear rod $b^2$, and the transverse rod B is provided centrally thereof with a depending rod $b^3$, which passes into the tubular stem of the front fork of the frame and which may be connected therewith in the usual manner, and said frame is provided with operative attachments which are of the following construction.

Mounted near the opposite ends of the transverse rods B are clamp-heads, which consist of bands C, which are provided with arms $C^2$, which project outwardly and with which are connected yoke-shaped heads $C^3$, the sides of which project backwardly and are provided on their lower sides with rings $C^4$, through which are passed set-screws $C^5$, and similar set-screws $C^6$ are passed through the bands or rings C, and I also provide a supplemental or handle-bar frame which is mounted on the main frame and is connected with the front rod B thereof, and in constructing this frame I provide two rods D, which are connected with sockets $d$, formed on circular heads $d^2$, which are mounted in the yokes $C^3$ and through which the front rod B of the main frame passes, and mounted on said rod B, between the bands or rings C of the clamp-heads and the bands or rings $C^4$, are spiral springs $d^3$, one end of each of which is secured to the ring or band C or to the rod B and the other to the socket or arm $d$ of the circular heads $d^2$, with which the rods D are connected.

The rods D are carried backwardly and passed over the cross-rod $b^2$ of the main frame, and said rods are preferably inwardly curved, as shown at $d^4$, and rearwardly of the cross-rod $b^2$ of the main frame the rods D are curved outwardly, as shown at $d^5$, and then inwardly, and are passed through the handles or grips $d^6$, as shown in Fig. 4, and said handles or grips are revolubly mounted on said rods and are held in the position shown in Fig. 2, and the rods D are projected inwardly at an inclination, as shown in said figure, and are provided with extensions $d^7$, which are connected by a bar E, which is provided with a forwardly and downwardly directed yoke $E^2$, in which is pivoted, as shown at $E^3$, a tubular casing $E^4$. This part of the construction is best shown in Figs. 2, 5, and 6, and the rear end of the tubular casing $E^4$ is provided at its opposite sides with downwardly-directed segmental arms $E^7$, and the yoke $E^2$ is provided with upwardly-directed lugs or projections $E^8$, through which are passed set-screws $E^9$, and said set-screws are adapted to bear on the segmental arms $E^7$ and hold the tubular casing $E^4$ in any desired position.

Passing through the tubular casing $E^4$ is a tube G, through which passes a rod $g$, the lower end of which is provided with a cross plate or head $g^2$, and the tube G projects upwardly and backwardly through the tubular casing $E^4$ and is provided with a flange or rim $g^3$, and secured to the corresponding end of the rod $g$, which projects through said tube, is a cross-plate $g^4$, which is provided with arms $g^5$, to which are adjustably secured supplemental arms $g^6$, said supplemental arms $g^6$ being longitudinally adjustable on the arms $g^5$ of the plate $g^4$, and pivotally connected at H with the outer ends of the supplemental arms $g^6$ are outwardly and inwardly curved spring-arms $h$, with which are pivotally connected spring-clamps or other suitable devices $h^2$, which are adapted to grasp or engage the upper portion of the body of the rider at the sides thereof below the arms. This feature of the construction is best shown in Fig. 10, and the clamp-heads by which the rods D of the supplemental frame are connected with the cross-rod B of the main frame of the guiding mechanism and the parts connected therewith are best shown in Figs. 2 and 9, and the object of the springs $d^3$ is to throw the rear part of the supplemental frame and the parts connected therewith upwardly, as hereinafter described, when the rods D are disconnected from the cross-rod $b^2$ of the main frame, as hereinafter described.

I also provide rods K, which are provided with circular heads $k$, through which the rod $b^2$ of the main frame passes, and the heads $k$ of the rods K may be connected with the rod $b^2$ in any desired manner, the only object in this connection being to provide means whereby the said heads $k$ may be turned on the rod $b^2$ and be prevented from longitudinal movement thereon, and for this purpose I may secure to the rod $b^2$ collars $k^2$, as shown in Fig. 2.

Hinged to the rods $k$, as shown at $k^4$ in Figs. 2 and 3, are curved tubes $k^5$, which are provided at their free ends with collars $k^6$, and passing through said collars into said tubes $k^5$ are rods $k^7$, which are provided with heads $k^8$, through which the extensions $d$ of the rods D pass, and said extensions are provided with collars $k^9$, which prevent the longitudinal movement of the rods $k^7$ thereon. By means of this construction the rods D of the supplemental frame, which are free to turn on the cross-rod B of the main frame of the steering mechanism, may be lowered into the position shown in dotted lines in Fig. 3 or raised into the position shown in full lines in said figure, or into a higher position, or into a position between the position shown in full and dotted lines in said figure, and said handle-bars may be held at any desired point of adjustment by means of set-screws L, which are passed through the collars $k^6$ of the tubes $k^5$.

I also provide devices for locking the supplemental frame in the position shown in dotted lines in Fig. 3, or in its lowest position, and these devices are best shown in Figs. 7 and 8, and in this construction I form in the cross-rod $b^2$ of the main frame, at the point where the rods D extend thereover, and in the rear side of said cross-rod triangular notches or recesses M, and I mount upon and secure to the rods D a sleeve or band $m$, and the rod $b^2$ is preferably provided at these points with upwardly-directed lugs or projections $m^2$ at each side of the rods D, and formed in each of said rods D, on the under side thereof, is a longitudinal notch or recess $m^3$, adjacent to one end of which is pivoted a pawl $m^4$, which is adapted to operate in the adjacent notch or recess M in the rod $b^2$, and mounted in said longitudinal notches or recesses $m^3$ are spiral springs $m^5$, which operate to force said pawls into said notches or recesses M in the rod $b^2$.

Formed in the under side of the rods D and in the under side of the sleeves $m$ are longitudinal grooves $m^6$, and pivotally connected with the pawls $m^4$ are rods $m^7$, and mounted in the bends or elbows of the rods D are crank-levers N, and the rods $m^7$ are composed of separate sections which are connected with these crank-levers, as shown in Fig. 4, and each of the outer sections of the rods $m^7$ is provided with a pin $n$, which passes through a diagonal slot $n^2$, formed in a tubular extension $n^3$, with which each of the handles or grips $d^6$ is provided.

As hereinbefore described, the handles or grips $d^6$ are revoluble on the rods D, and mounted in each of said handles is a spiral spring O, one end of which is secured to the handles or grips and the other to the corresponding rod D, and the object of these springs is to force the pawls $m^4$ into engagement with the rod $b^2$ of the main frame, and by turning said handles or grips the said pawls may be drawn out of engagement with said rod $b^2$ and the supplemental frame will be raised into the position shown in Fig. 3 by the springs $d^3$, or may be raised into said position by hand, and I also provide devices for preventing the handles or grips from being turned on the rods D, said devices consisting of a plug or bolt $O^3$, which is passed into slots or grooves formed in the rods D and in the inner ends of the handles or grips, and these plugs or bolts may be held in position by springs O³, secured to the rods D, or by any other suitable devices.

The object of the springs $d^3$ is to automatically raise the supplemental frame into the position shown in Fig. 3 when the rods D are disconnected from the cross-rod $b^2$ of the main frame, but said springs and the clamps with which said springs are connected are not essential to this invention and may or may not be employed, the chief object in this connection being to mount the supplemental frame on the rod B of the main frame, so that the rear portion thereof may be raised and lowered thereon.

By means of the construction described the supplemental frame of the guiding mechanism may be locked to the cross-rod $b^2$ of the main frame thereof, or in the position shown in dotted lines in Fig. 3, and may be used in this position, or said supplemental frame may be raised into the position shown in full lines in Fig. 3, or into a higher position, or into a position lower than that shown in full lines in said figure, and the handles or grips may be used for guiding the vehicle in any position of said supplemental frame; but the chief object of thus raising and lowering the supplemental frame or providing means for holding said frame in the raised position is also to provide means whereby the vehicle may be guided by the body of the rider, and for this purpose I provide the tubular casing $E^4$ and the parts connected therewith, including the spring-arms $h$ and the spring-clamps or other devices $h^2$, which are adapted to engage with the sides of the body below the arms when the supplemental or handle-bar frame is in a raised position, and by means of this construction the vehicle may be guided without applying the hands to the handle-bars or to the handles or grips, and for this purpose the spring-arms $h$ may be so made as to engage with the breast of the rider instead of the sides of the body.

It will be observed that the supplemental frame takes the place of the ordinary handlebars, and my invention is not limited to the exact form and construction of the various parts thereof as herein described, and it will be apparent that other means for raising and lowering the supplemental or handle-bar frame may be employed, and the arms connected with the plate $g^4$, which is connected with the tubular casing $E^4$, may be of different construction, the only object in this connection being to provide suitable devices for engaging the body, so that the vehicle may be steered or guided without applying the hands to the handles or grips.

The rods D of the supplemental frame are adjustable in the sockets $d$, and the rods K are preferably composed of telescopic sections, as shown in Fig. 3, so as to conform to any extension that may be made of the rods D of the supplemental frame, and the sleeves $m$ are adjustable on the rods D of the supplemental frame, and the pawls $m^4$ are pivotally connected with said sleeves in order that the locking device or the separate parts thereof may also be adjusted to correspond with the adjustment of the supplemental frame in the sockets $d$, and the springs $m^5$ are also attached to the inside of the sleeves $m$, and the recesses $m^3$ in the rods D are made large enough to permit of the operation of said springs, and that section of the rod $m^7$ which passes into the sleeves $m$ is also made adjustable, as shown in Fig. 4 at $m^9$.

The object of the spiral springs O is to revolve the handles back to place after being used to operate the pawls $m^4$, and the spiral springs $m^5$ operate to force the pawls into the recesses M, and the object of holding the supplemental or handle-bar frame in a raised position is not only to provide means for guiding the vehicle by means of the body, as herein described, but also to form a support for the body in order that the arms may be used for any purpose desired. It will also be seen that the tubular casing $E^4$ is adapted to be swung in the yoke $E^2$, so as to raise or lower the arms connected with the plate $g^4$, and the tube G is longitudinally adjustable in said tubular casing $E^4$ by means of a set-screw P; and it will be apparent that many other changes in and modifications of the construction herein described may be made without departing from the spirit of my invention or sacrificing its advantages.

Having fully described my invention, I claim as new and desire to secure by Letters Patent—

1. In a guiding mechanism for bicycles and similar vehicles, a main frame which is adapted to be connected with the forward upright fork of the bicycle in the usual manner, a supplemental frame connected with and adapted to turn on the forward part of the main frame, and which is projected backwardly across the rear portion of the main frame, handles or grips connected with the rear portion of the supplemental frame, and a support connected with the rear part of the supplemental frame and provided with arms which are adapted to engage with the body of the rider, whereby the vehicle may be guided without taking hold of the handles or grips, and said supplemental frame and the rear portion of the main frame being also connected by adjustable devices, whereby the rear portion of the supplemental frame may be raised and lowered, and held in any desired position, substantially as shown and described.

2. In a guiding mechanism for bicycles and similar vehicles, a main frame which is adapted to be connected with the forward upright fork of the bicycle in the usual manner, a supplemental frame with which the handles or grips are connected, said supplemental frame consisting of side rods which are pivotally connected with and adapted to turn on the forward part of the main frame, and which are projected backwardly across the rear portion of the main frame, and connected by a cross-rod, the handles or grips being connected with the rear portion of the supplemental frame, adjacent to the ends of said cross-rod, a support connected with said cross-rod and provided with devices which are adapted to engage with the body of the rider, whereby the vehicle may be guided without taking hold of the handles or grips, and the cross-rod of the supplemental frame and the rear portion of the main frame being also connected by adjustable devices, whereby the rear portion of the supplemental frame may be raised and lowered, and held in any desired position, said handles or grips being also revolubly connected with the supplemental frame, and in operative connection with devices whereby the supplemental frame may be locked in connection with the main frame, substantially as shown and described.

3. A guiding or steering mechanism for bicycles and similar vehicles, consisting of a main frame which is adapted to be connected with the forward upright fork of the vehicle in the usual manner, a supplemental frame consisting of side rods which are pivotally connected with and adapted to turn on the forward portion of the main frame, and which are projected backwardly beyond the rear portion of said frame, and connected by a cross-rod, handles or grips connected with said supplemental frame adjacent to the ends of said cross-rod, a yoke formed centrally in said cross-rod, a tubular casing pivotally supported therein and adapted to be turned on its supports, and adjusted to any desired position, a tube mounted in said tubular casing and adjustable therein, and arms or holders connected with said tube, and adapted to engage with the body of the rider, whereby the vehicle may be guided without the use of the handles or grips, substantially as shown and described.

4. A guiding or steering mechanism for bicycles and similar vehicles, consisting of a main frame which is adapted to be connected with the forward upright fork of the vehicle in the usual manner, a supplemental frame consisting of side rods which are pivotally connected with and adapted to turn on the forward portion of the main frame, and which are projected backwardly beyond the rear portion of said frame, and connected by a cross-rod, handles or grips connected with said supplemental frame adjacent to the ends of said cross-rod, a yoke formed centrally in said cross-rod, a tubular casing pivotally supported therein and adapted to be turned on its supports, and adjusted to any desired position, a tube mounted in said tubular casing and adjustable therein, and arms or holders connected with said tube, and adapted to engage with the body of the rider, whereby the vehicle may be guided without the use of the handles or grips, the rear portion of the supplemental frame and the rear portion of the main frame being also connected by rods which are pivotally connected with the rear portion of the main frame and adapted to turn thereon, tubes which are hinged to said rods, and rods pivotally connected with the supplemental frame and passing into said tubes, substantially as shown and described.

5. A mechanism for guiding bicycles and similar vehicles, comprising a main frame, which is adapted to be connected with the forward front fork of the vehicle, in the usual manner, a spring-operated supplemental frame comprising side bars which are connected with and adapted to turn on the forward part of the main frame, and which are projected backwardly across the rear portion of the main frame, and connected by a cross-rod, handles or grips, revolubly mounted on the supplemental frame adjacent to the ends of said cross-rod, and locking devices connected with said handles or grips, and with the main and supplemental frames, and adapted to be operated by said handles or grips, whereby the main and supplemental frames may be locked together, substantially as shown and described.

6. A mechanism for guiding bicycles and similar vehicles, comprising a main frame, which is adapted to be connected with the forward front fork of the vehicle, in the usual manner, a spring-operated supplemental frame comprising side bars which are connected with and adapted to turn on the forward part of the main frame, and which are projected backwardly across the rear portion of the main frame, and connected by a cross-rod, handles or grips revolubly mounted on the supplemental frame adjacent to the ends of said cross-rod, and locking devices connected with said handles or grips, and with the main and supplemental frames, and adapted to be operated by said handles or grips, whereby the main and supplemental frames may be locked together, the rear portion of the supplemental frame and the rear portion of the main frame being also connected by adjustable devices whereby the rear portion of the supplemental frame may be raised and locked in any desired position, substantially as shown and described.

7. A mechanism for guiding bicycles and similar vehicles, comprising a main frame, which is adapted to be connected with the forward front fork of the vehicle, in the usual manner, a spring-operated supplemental frame comprising side bars which are connected with and adapted to turn on the forward part of the main frame, and which are projected backwardly across the rear portion of the main frame, and connected by a cross-rod, handles or grips revolubly mounted on the supplemental frame adjacent to the ends of said cross-rod, and locking devices connected with said handles or grips, and with the main and supplemental frames, and adapted to be operated by said handles or grips, whereby the main and supplemental frames may be locked together, the rear portion of the supplemental frame and the rear portion of the main frame being also connected by adjustable devices whereby the rear portion of the supplemental frame may be raised and locked into any desired position, said rear portion of the supplemental frame being also provided with devices which are adapted to engage with the body of the rider whereby the vehicle may be guided without the use of the handles or grips, substantially as shown and described.

In testimony that I claim the foregoing as my invention I have signed my name, in presence of the subscribing witnesses, this 13th day of April, 1897.

JOEL MIX GILBERT.

Witnesses:
MECCA PEAVEY,
HOWARD S. BAKER.